United States Patent
Christensen

(10) Patent No.: US 7,243,778 B2
(45) Date of Patent: Jul. 17, 2007

(54) SORTING PLANT FOR SORTING ITEMS FED IN BULK

(75) Inventor: Kent Christensen, Tjele (DK)

(73) Assignee: Vorning Maskinfabrik ApS, Tjele (DK)

( * ) Notice: Subject to any disclaimer, the term of this patent is extended or adjusted under 35 U.S.C. 154(b) by 0 days.

(21) Appl. No.: 10/496,883

(22) PCT Filed: Oct. 28, 2002

(86) PCT No.: PCT/DK02/00714

§ 371 (c)(1),
(2), (4) Date: May 26, 2004

(87) PCT Pub. No.: WO03/045589

PCT Pub. Date: Jun. 5, 2003

(65) Prior Publication Data

US 2005/0000780 A1    Jan. 6, 2005

(30) Foreign Application Priority Data

Nov. 26, 2001 (DK) .......................... PA 2001 01759

(51) Int. Cl.
*B65G 47/244* (2006.01)
*B65G 47/14* (2006.01)
(52) U.S. Cl. ...................................... 198/416; 198/453
(58) Field of Classification Search ................ 198/415, 198/416, 453
See application file for complete search history.

(56) References Cited

U.S. PATENT DOCUMENTS

| | | | |
|---|---|---|---|
| 3,109,529 A | * | 11/1963 | Carter .......................... 198/444 |
| 3,866,739 A | | 2/1975 | Thaddeus |
| 4,105,398 A | * | 8/1978 | Disch et al. ................. 198/453 |
| 4,284,186 A | * | 8/1981 | Brouwer ...................... 198/415 |
| 4,889,224 A | | 12/1989 | Denker |
| 4,990,034 A | * | 2/1991 | Kapke et al. .................. 406/88 |
| 6,259,967 B1 | | 7/2001 | Hartlepp et al. |

FOREIGN PATENT DOCUMENTS

| DK | 2002 00096 U3 | 5/2002 |
|---|---|---|
| SE | 412 888 | 3/1980 |
| WO | 01/72616 | 10/2001 |

* cited by examiner

*Primary Examiner*—Mark A. Deuble
(74) *Attorney, Agent, or Firm*—James Creighton Wray

(57) ABSTRACT

In connection with making cast paving bricks of concrete with rectangular basic shape, sometimes there is performed a finishing treatment of the bricks by "rumbling" where the bricks otherwise organized on pallets or a casting board are transferred to a cylindric drum where these are tumbled with the purpose of achieving a surface with particular appearance. It has appeared that rumbled bricks, for price reasons, are preferred to be delivered in bulk, as a subsequent manually performed pelletizing is a relatively expensive element. Thus there is indicated a sorting unit including a conveyor with a conveyor belt over the surface of which, between a receiving area for the bricks and a delivery area, there are mutually spaced guide bars disposed obliquely in relation to the direction of movement (F) of the conveyor, by which the bricks are guided in a row with the same orientation for subsequent pelletizing by machine.

10 Claims, 3 Drawing Sheets

SORTING PLANT FOR SORTING ITEMS FED IN BULK

This application claims the benefit of Danish Application No. 2001 01759 filed Nov. 26, 2001 and PCT/DK02/00714 filed Oct. 28, 2002.

BACKGROUND OF THE INVENTION

The present invention concerns a sorting unit for sorting items supplied to the sorting unit in bulk, preferably paving bricks with rectangular basic shape.

The need for special sorting units arises in particular in connection with production facilities for cast paving bricks, where the cast items are subjected to finishing treatment before transporting to stock or to the end user. Under normal circumstances, such cast block bricks may be laid out on the casting board in formation where they may palletised relatively easily after drying without any sorting in advance.

Certain types of paving brick are, however, after hardening of the concrete are subjected to finishing treatment in the form of "rumbling", where the bricks otherwise arrayed on the casting board are transferred to a cylindric rotating drum, and the bricks are applied a kind of mellowness in that they are bumping against each other during the tumbling/rolling, whereby the edges of the brick are slightly blurred, and the surface is imparted a special, slightly worn appearance.

After the above treatment, the said paving bricks will be led out from the drum and are subsequently found in bulk, i.e. in a pile without any special arrangement of the bricks. In some cases, one has subsequently performed palletising of the bricks which is a particularly costly work, as individual bricks are to be handled manually and be laid upon a pallet, inferring that the price for rumbled bricks arranged on pallets is considerably greater than for similar bricks delivered in bulk. The advantage of delivering the bricks on pallets is that these are more easily handled/laid out than if they are only delivered in bulk, where they e.g. are tilted off a lorry upon the ground in a pile, from which they are transported/handled manually to the final laying site.

The need for rumbled paving bricks of concrete laid on pallets before delivery is thus great, but until now the purchasers of said types of paving bricks have refrained from having these delivered in palletised condition to a greater extent due to the somewhat higher delivery price for said bricks. Furthermore, it is to be noted that for the producer/wholesaler of the paving bricks delivered in bulk, it may sometimes be difficult to determine the accurate number of bricks delivered in connection with orders of a given number of square meters when the brick are in bulk. On the part of the producer/provider it is also necessary to be able to deliver the paving bricks in palletised condition.

U.S. Pat. No. 3,866,739, Sikorski, discloses an apparatus for unscrambling containers, where a take away conveyor; a shunting bar converging toward said take away conveyor; means for conveying containers to and along the shunting bar toward the take away conveyor; means for vibrating the shunting bar to assure free flow movement of the containers from the bar onto the take away conveyor; and means on the bar for effecting spinning of the containers which contact the bar by being propelled there toward by said conveying means, and wherein said means for effecting spinning comprises a frictional cushioning strip attached to and providing a facing of substantial thickness along the bar. The cushioned bar is mounted as a deflector across the path of side by side progressive speed advancing conveyors to divert containers randomly placed thereon toward single file orientation on a maximum speed take away conveyor. Oscillation of the bar jogs the containers to prevent jamming.

U.S. Pat. No. 4,889,224, Denker, discloses a conveyor system, which receives products in random order at its inlet end and delivers product in a serial aligned order at its outlet end. The conveyor system comprises first and second endless belt conveyors, which are longitudinally aligned and positioned such that the product exiting the first conveyor is received on the second conveyor. The first conveyor is of a greater width than the second and at the location where they meet is a third endless belt conveyor moving in a direction perpendicular to the longitudinal flow direction of the other two. The machine that feeds products to the first conveyor is set at a desired product flow rate in terms of products-per-minute and the speed of the first conveyor is set to handle that capacity. The second belt is driven at a speed equal to or greater than the product-per-minute rate times the product length. As misaligned products flowing on the first conveyor are intercepted by the transversely positioned third conveyor, the products are rotated as they are urged onto the second conveyor so that the length dimension of the products is generally aligned with the second conveyor.

SUMMARY OF THE INVENTION

By the invention it has been realised that it will be possible to perform organising of paving bricks of the indicated king in a guided row by a sorting unit being characterised in that sorting unit includes a plane conveyor with a largely horizontally running conveyor with a front end and a rear end, where the rear end includes a receiving area for supplying items in bulk which are laid on the conveyor belt, and where from the receiving area and to a delivery area at the front end of the conveyor at a level above the conveyor belt there is a horizontal support beam obliquely oriented in relation to the conveying direction of the conveyor, including a plurality of downwards projecting, mutually spaced guide bars that are displaced in parallel and with inclination relative to the beam, with a front side oriented against the direction of conveying of the conveyor, and where the undersides of the bars extend substantially in parallel with and immediately over the surface of the conveyor belt.

The effect of the sorting unit is surprising since it appears that the paving bricks with rectangular basic shape by supplying in the receiving area are evenly distributed on the conveyor belt and are moved against the inclining guide bars, initially with an arbitrary side edge sliding against the front side of the guide bars. The spacings between the guide bars, however, provide that the paving bricks at the latest, before they reach the delivery area, are guided so that their longest side edge is running in parallel with the front sides of the guide bars.

With the purpose of delivering the now arrayed paving bricks into a straight row in the delivery area for further organising in a palletising facility, the guide bar in the delivery area may be rounded so that its free end is oriented with inclination towards the centre axis of the conveyor.

With the purpose of ensuring an efficient and rapidly effected organising of the supplied paving bricks, the front sides of the guide bars can be provided with a friction inducing surface coating. Hereby may be achieved that the paving bricks are relatively quickly/early in their course through the sorting unit guided as described above. The surface coating furthermore serves the purpose of protecting the guide bars against wear.

Depending on the size and weight of the brick type processed in the sorting unit, it will sometimes be necessary to perform a change in the inclination of the support beam in relation to the conveying direction of the conveyor, which is made possible by the support beam being mounted adjustable on the sorting unit. The same is the case with regard to the width of the delivery area, as indicated in claim 5, and sometimes it will also be necesary to perform a change in inclination of the guide bars relative to the support beam, which is possible by the guide bars being mounted so that they are adjustable.

Depending on the size and weight of the bricks, the spacings between respective guide bars may be of great significance for the desired organising of the paving bricks being sliding against the front side of the guide bars. This spacing between the guide bars can thus be adjustable, cf. FIG. 7.

In connection with supplying the paving bricks in bulk, their order is arbitrary. In order that the paving bricks are placed upon their largest surfaces, it may sometimes be advantageous that the conveyor/transporting unit inclines slightly, typically so that the course of the belts between the supply area and the delivery area is slightly rising. This inclination is dependent on the size of the bricks and of the speed with which the belts are conveyed in the direction of movement. With the purpose of making the sorting unit as flexible as possible, it may thus be provided on an underframe having legs that are adjustable. Hereby is achieved a reasonably large liberty with regard to the inclination of the conveyor.

In connection with organising the said paving bricks prior to palletising, a quality test is performed before the paving bricks are leaving the sorting unit, the test typically being performed manually by a person situated in the sorting area who is sorting off/removes the paving bricks that are damaged and unsuited for use. With the intention that the work can be performed with some certainty regarding the quality, a suitable conveying speed for the conveyor belt will be in the area 0.8 to 1.6 m/s, typically in the range 1.0-1.4 m/s, and preferably with the range 1.1–1.3 m/s. The precise speed to be preferred will depend on the brick size processed in the sorting unit, why the sorting unit will furthermore be provided with means for stepless regulation of the belt speed as indicated in claim 10.

The invention will be explained in more detail in the following with reference to the drawing, where:

DETAILED DESCRIPTION OF THE PREFERRED EMBODIMENTS

Figure 1:
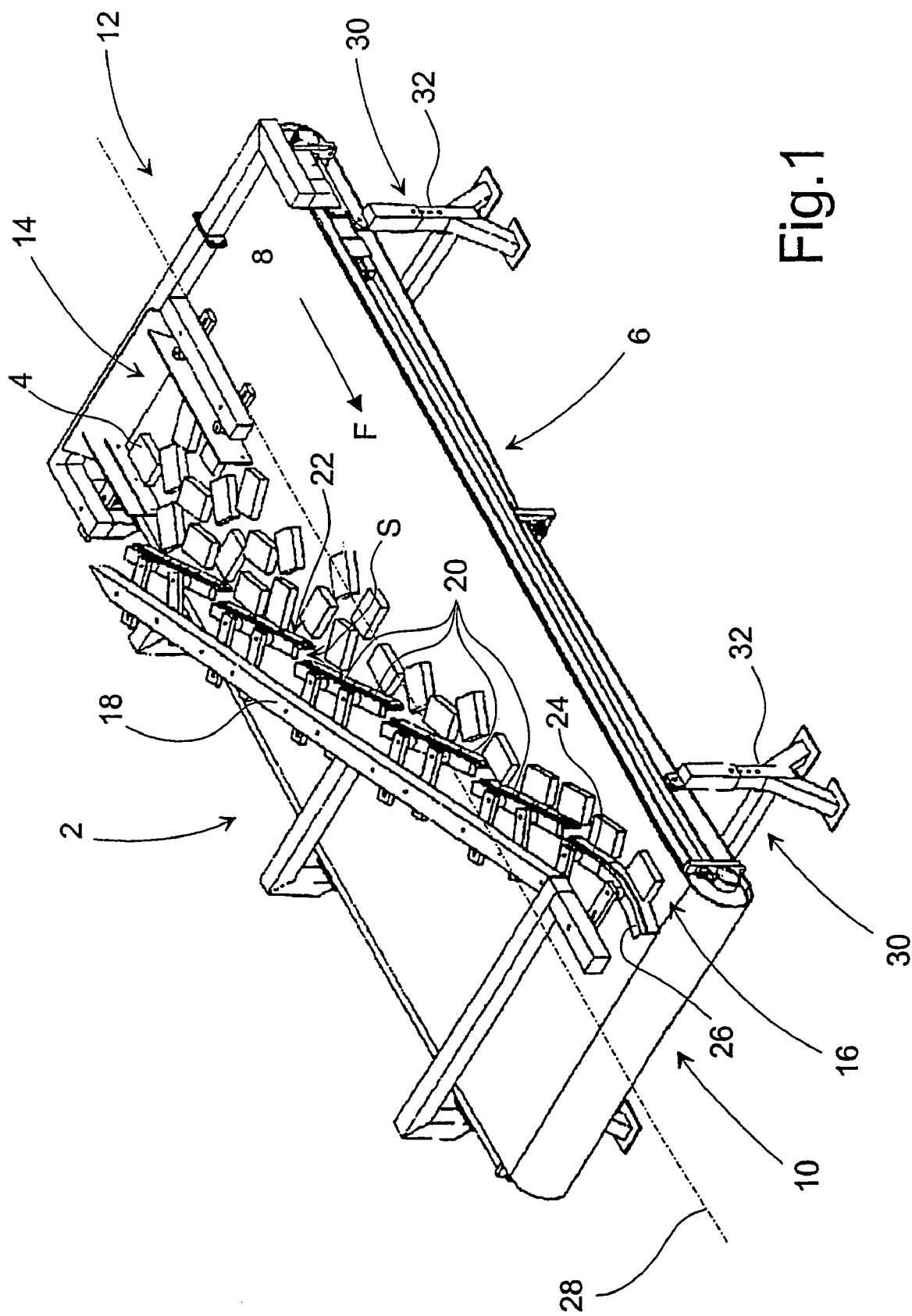
FIG. 1 is perspective view of a sorting unit according to the invention as seen obliquely from above.

The sorting unit 2 shown in FIG. 1 is supplied paving bricks 4 in bulk and includes a conveyor 6 with a largely horizontally running conveyor belt 8 with a front end 10 and a rear end 12, where the rear end 12 includes a receiving area 14 for the supply of said items in bulk which are laid upon the conveyor belt. The sorting unit 2 furthermore includes a delivery area 16 at the front end 10, and between the receiving area 14 and the delivery area 16 there is provided a support beam 18 oriented obliquely in relation to the moving direction F of the conveyor, including a plurality of downwards projecting guide bars 20 that are mutually spaced apart, displaced in parallel and inclining relative to the beam 19 and having a front side 22 oriented against the direction of conveying F of the conveyor. The undersides of the guide bars are extending substantially in parallel with and immediately above the surface of the conveyor belt 8.

On the support beam 18, there is a guide bar 24 in the delivery area 16 which is rounded and the free end 26 of which is finished oriented inclining towards the centre axis 28 of the conveyor.

The front side 22 of the guide bars is furthermore provided with friction inducing surface coating 30 which furthermore serves to protect the guide bars against wear from the brick items sorted in the sorting unit.

The sorting unit has the following mode of operation: The conveyor is started with the belt running in direction F, and paving bricks with rectangular basic shape are supplied to the receiving area 14, whereby they are moved against the inclining guide bars by the movement of the conveyor, whereby the bricks are guided so that at least one of their sides is extending in parallel with and in contact with a front side 22 of one of the guide bars 20.

Figure 2:
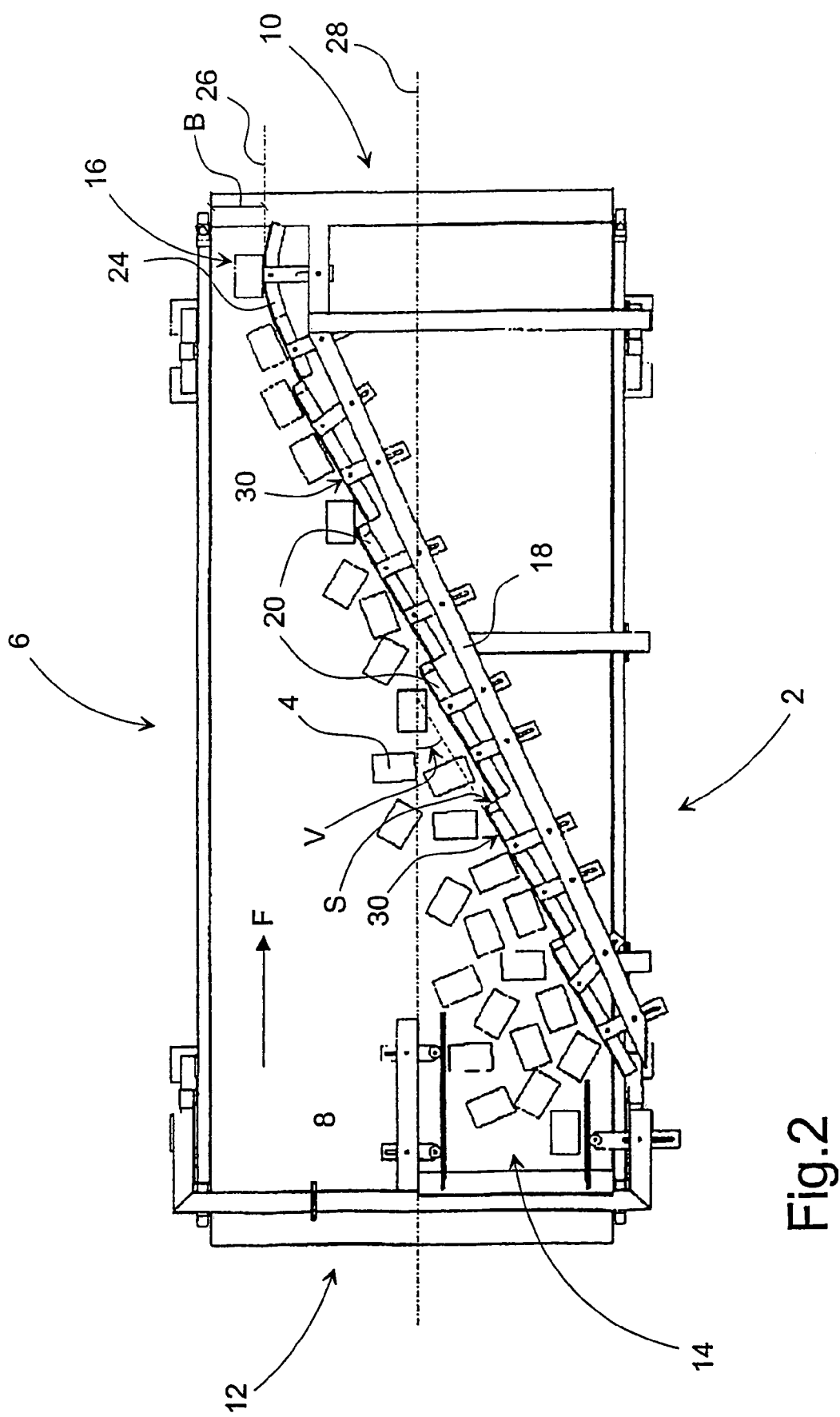
FIG. 2 is a top view of the sorting unit shown in FIG. 1.

The guide bars are, as it appears from FIGS. 1 and 2, evenly distributed along the support beam 18 and with an oblique course in relation to the direction of movement F of the conveyor which is deviating from the inclining orientation of the support beam 18. The front sides of the guide bars are mainly oriented in parallel, but the individual guide bars are staggered in parallel relative to each other, which means that the paving bricks are turned during their displacement in parallel with the front side faces 22 of the guide bars 18 so that they, before they are coming in abutment against the guide bar 24 in the delivery area, will be oriented with one long side of the rectangular basic shape in parallel with and in contact with a front side face 22 on the guide bars 20.

In the delivery area, the paving bricks will thus pass arrayed with the bricks in a row and oriented the same way, and it will here be possible to perform a manual sorting of the paving bricks 4 that are not fulfilling the quality requirements applicable for a delivery of this type of bricks.

Figure 3:
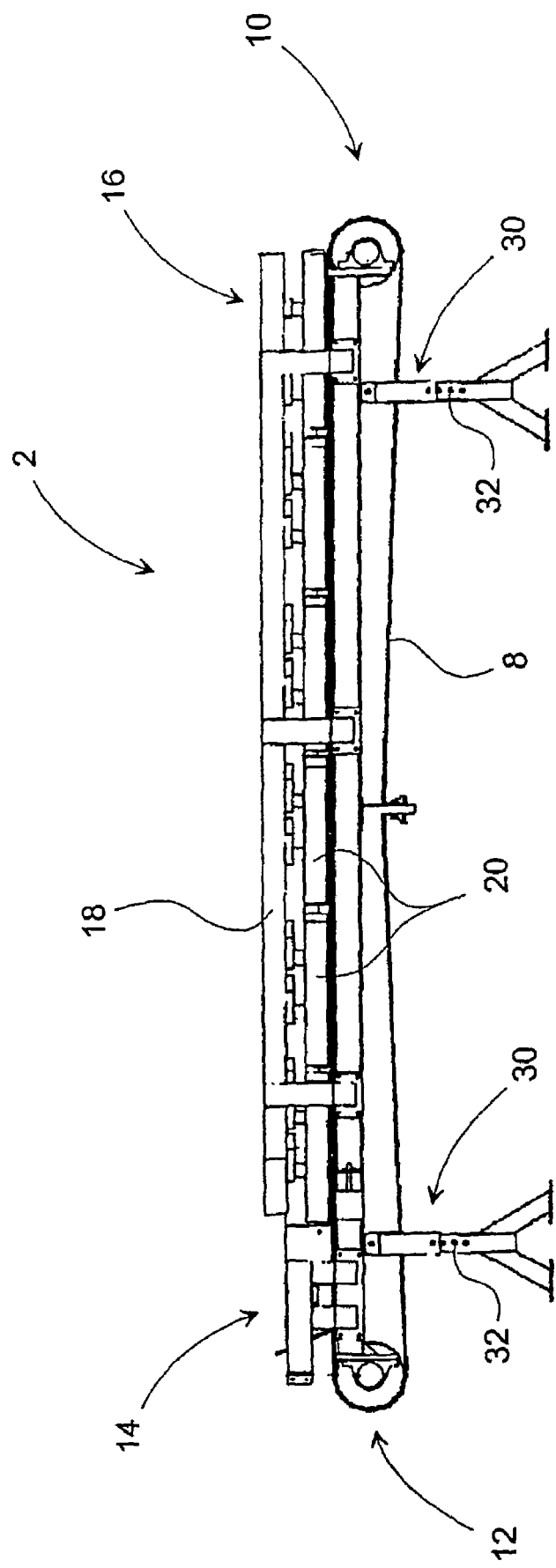
FIG. 3 is a side view of the sorting unit shown in FIGS. 1 and 2.

As further appearing from FIGS. 1 and 3, the conveyor 6 is disposed on an underframe 30 with longitudinally adjustable legs. The purpose with this is that sometimes it will be desirable that the conveyor 6 has a slightly rising course between the receiving area 14 and the delivery area 16 which will cause supplied brick items disposed standing on a side edge or an end edge are more liable to tilt so that they come to lie on their largest surface in order that these can be guided into a row as mentioned above.

It is preferred that the support beam 18 as well as the guide bars 20, 24 are mounted so that they are adjustable with regard to the angle V they are forming with the centre axis 28 of the conveyor.

The guide bar 24 in the delivery area 16 is also adjustable with regard to the aforesaid angle and furthermore adjustable in the lateral direction of the conveyor with the purpose of adjusting the width B of the delivery area 16.

The speed of the conveyor belt 8 is steplessly adjustable by known measures within an interval in the range 0.8–1.6 m/s. Practical experiments in connection with using the sorting unit for arraying the commonly occurring paving bricks with rectangular basic shape have shown that a preferred speed is within the range 1.1–1.3 m/s, and typically 1.2 m/s. With this speed is also achieved a rather secure manual quality control and sorting off of unsuited items from the paving bricks guided into a row.

Finally, it is to be noted that, probably in connection with sorting/organising other kinds of rectangular items, such as fruit cans in the consumption industry, there are sorting units that guide the said units into rows in connection with packing etc.

It is to be underlined that the invention is of considerable importance within the field concerned which includes production of the rumbled paving brick that is palletised subsequently, before these are brought to the end user. After the said paving bricks have been guided into an array in the sorting unit according to the invention, it will be relatively simple to perform guiding into paths and dividing these paths into formations of the bricks, which in a relatively simple way may be laid up on a pallet.

| Reference number list: | |
|---|---|
| 2: | sorting unit |
| 4: | items (paving bricks) |
| 6: | conveyor |
| 8: | conveyor belt |
| 10: | front end of conveyor belt |
| 12: | rear end of conveyor belt |
| 14: | receiving area |
| 16: | delivery area |
| 18: | support beam |
| 20: | guide bars |
| 22: | front side of guide bars |
| 24: | guide bar in delivery area (16) |
| 26: | free end of (24) |
| 28: | centre axis of conveyor |
| 30: | underframe of (6) |
| 32: | longitudinally adjustable legs on (30) |
| B: | width of delivery area (16) |
| F: | direction of movement of conveyor |
| S: | spacing between guide bars (20) |

The invention claimed is:

1. Arranging unit for arranging items, wherein the arranging unit includes a plane conveyor with a largely horizontally running conveyor belt with a front end and a rear end, wherein the rear end includes a receiving area for supplying items which are laid on the conveyor belt, and wherein from the receiving area and to a delivery area at the front end of the horizontally running conveyor belt at a level above the horizontally running conveyor belt there is a horizontal support beam obliguely oriented in relation to the conveying direction (F) of the horizontally running conveyor belt, wherein the horizontal support beam includes a plurality of mutually spaced guide bars extending downwardly from said support beam and being displaced in parallel and with an inclination relative to the beam, with a front side oriented obliquely against the direction of conveying (F) of the horizontally running conveyor belt, and wherein the undersides of the bars extend substantially in parallel with and immediately over the surface of the horizontally running conveyor belt, further comprising an adjustment structure for adjusting the inclination of the support beam relative to the conveying direction (F) of the horizontally running conveyor belt.

2. Arranging unit according to claim 1, wherein the final guide bar, located an the delivery area such that the end of the guide bar is at the front edge of the unit, is rounded, and wherein its free end is finished with inclining orientation away from the centre axis of the horizontally running conveyor belt.

3. Arranging unit according to claim 1, wherein front sides of the guide bars are provided with a friction inducing surface coating.

4. A method for sorting paving bricks having rectangular shapes, wherein paving bricks are fed into the receiving area of the apparatus of claim 1 which conveys, sorts, and delivers the bricks to the delivery area of the apparatus.

5. Arranging unit for arranging items, wherein the arranging unit includes a plane conveyor with a largely horizontally running conveyor belt with a front end and a rear end, wherein the rear end includes a receiving area for supplying items which are laid on the conveyor belt, and wherein from the receiving area and to a delivery area at the front end of the horizontally running conveyor belt at a level above the horizontally running conveyor belt there is a horizontal support beam obliquely oriented in relation to the conveying direction (F) of the horizontally running conveyor belt, wherein the horizontal support beam includes a plurality of mutually spaced guide bars extending downwardly from said support beam and being displaced in parallel and with an inclination relative to the beam, with a front side oriented obliquely against the direction of conveying (F) of the horizontally running conveyor belt, and wherein the undersides of the bars extend substantially in parallel with and immediately over the surface of the horizontally running conveyor belt, further comprising an adjustment structure for adjusting the width (B) of the delivery area.

6. Arranging unit according to claim 5, further comprising an adjustment structure for adjusting the inclination (V) of the guide bars relative to the centre axis of the horizontally running conveyor belt.

7. Arranging unit according to claim 5, further comprising an adjustment structure for adjusting the spacing (S) between the guide bars.

8. Arranging unit for arranging items, wherein the arranging unit includes a plane conveyor with a largely horizontally running conveyor belt with a front end and a rear end, wherein the rear end includes a receiving area for supplying items which are laid on the conveyor belt, and wherein from the receiving area and to a delivery area at the front end of the horizontally running conveyor belt at a level above the horizontally running conveyor belt there is a horizontal support beam obliquely oriented in relation to the conveying direction (F) of the horizontally running conveyor belt, wherein the horizontal support beam includes a plurality of mutually spaced guide bars extending downwardly from said support beam and being displaced in parallel and with an inclination relative to the beam, with a front side oriented obliquely against the direction of conveying (F) of the horizontally running conveyor belt, and wherein the undersides of the bars extend substantially in parallel with and immediately over the surface of the horizontally running conveyor belt, wherein the horizontally running conveyor belt is disposed on an underframe having legs and further comprising an adjustment structure for adjusting the legs longitudinally.

9. Arranging unit according to claim 8, wherein the conveying speed of the horizontally running conveyor belt is in the range 0.8 to 1.6 m/s.

10. Arranging unit according to claim 8, wherein conveying speed for the horizontally running conveyor belt on the conveyor is steplessly variable by known means within a conveying speed in the range 0.8–1.6 m/s.

* * * * *